(12) United States Patent
Fiedler

(10) Patent No.: US 8,480,498 B2
(45) Date of Patent: *Jul. 9, 2013

(54) SYNCHRONIZING MISSION PROGRESS IN COOPERATIVE GAMES

(71) Applicant: Sony Computer Entertainment America LLC, Foster City, CA (US)

(72) Inventor: Glenn Fiedler, Santa Monica, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/657,730

(22) Filed: Oct. 22, 2012

(65) Prior Publication Data

US 2013/0045795 A1    Feb. 21, 2013

Related U.S. Application Data

(63) Continuation of application No. 12/621,379, filed on Nov. 18, 2009, now Pat. No. 8,308,570.

(51) Int. Cl.
*A63F 9/24* (2006.01)

(52) U.S. Cl.
USPC ............. 463/42; 463/9; 463/40; 463/41

(58) Field of Classification Search
USPC ............................................. 463/9, 40–42
See application file for complete search history.

(56) References Cited

U.S. PATENT DOCUMENTS

| 6,361,440 | B1 | 3/2002 | Ogawa et al. |
| 7,376,753 | B2 | 5/2008 | Tanaka et al. |
| 8,118,671 | B2 | 2/2012 | Toyama |
| 2005/0059491 | A1 | 3/2005 | Oh |
| 2005/0256985 | A1 | 11/2005 | Shea |
| 2008/0254895 | A1 | 10/2008 | Gatto et al. |

FOREIGN PATENT DOCUMENTS

WO    WO 9814882 A1    9/1998

*Primary Examiner* — Dmitry Suhol
*Assistant Examiner* — David Duffy
(74) *Attorney, Agent, or Firm* — Kilpatrick Townsend and Stockton LLP

(57) ABSTRACT

Methods and systems are described for a multiplayer video game on a network in which a player's or players' missions are tracked individually as mission lines, each mission line being composed of a series of ordered objectives. Each objective generally must be completed in order of the sequence with no forking of objective paths. Each objective can include one or more conditions that can be completed in any order within the objective. Players can go off on different missions and then come back to synchronize their mission progress so that they benefit from the other player's gameplay. Players can also synchronize the conditions achieved within the missions during long missions with many difficult conditions to achieve in order to advance their combined progress.

20 Claims, 14 Drawing Sheets

SYNCHRONIZING MISSION PROGRESS IN COOPERATIVE GAMES

CROSS-REFERENCES TO RELATED APPLICATIONS

This application is a continuation of U.S. Pat. No. 8,308,570, filed Nov. 18, 2009, which is hereby incorporated by reference in its entirety for all purposes.

BACKGROUND

1. Field of the Invention

This application relates generally to the field of video game amusement devices including means for processing data in a networked environment. Specifically presented are methods and systems for synchronizing progress among players on peer-to-peer network connected video game consoles, handheld electronic devices, cellular telephones, personal computers, and other machines on which games are played.

2. Description of the Related Art

Many computer video games are programmed to be able to be played with one or more players on a single video game console. In some video games, multiple players can connect multiple consoles together through a phone, cable, wireless, or other network. Connecting multiple game consoles together can allow the processing power of each game console, which sometimes houses an extraordinarily powerful central microprocessor, graphics rendering and audio processors, and fast memory, to service the processing needs of each player local to the game console while tying game play of all the consoles into one combined game. For enhanced realism and smooth game play, it is often critical for these networked game consoles to work near the envelope of their processing and memory limits.

There are two common types of network architecture for routing packets and other communication signals among networked game consoles: client-server and peer-to-peer.

FIG. 1 illustrates a "client-server" network architecture. Communications go between each client and the server, but generally not between clients. In one type of client-server architecture, the client computers are often disparate models (e.g. various personal computers or game consoles) to one another that communicate to a central server or set of servers over a wide area network, such as the Internet. In a video game, the central server tracks the location of each player, non-player character, and various items and objects in the video game.

In another type of client-server architecture, the client computers are the same model or relatively similar types (e.g. game consoles) in which one of the clients acts as a server. The server can be selected in an ad hoc fashion between the various connected consoles, and is typically the host player's console, which is the console of the first player to begin the game.

FIG. 2 illustrates a "peer-to-peer" network architecture. Communications typically go between each and every peer. Similar or disparate types of computers can be connected with one another in a peer-to-peer topology. In a video game, the peers pass messages and other communications with one another to duplicate the locations of players, non-player characters, objects, etc. in each peer.

Multiplayer games can pit different players directly against each other, such as in a shoot-to-kill game. Multiplayer games can also have players cooperate to achieve a desired goal in the game. Cooperative games can involve players in the same platoon in a war simulation, on the same quest in an adventure series, or pursuing other exciting missions.

An 'open world' video game is a game in which the virtual area of interactive gameplay is visible across much of the world. For example, in an open world video game set in a city, a player can see, or even affect, objects on the another side of the city from across the city. A player can potentially see a helicopter flying from another side of the city all the way to hover over his position. A player can also potentially see another player storm across the city toward him.

Multiplayer open world video games on peer-to-peer connected game consoles present difficult challenges for a game developer when it comes to staying within the processing, memory, and bandwidth budgets of each game console. Even though several game consoles may be connected together and share the load in some respects, one game console is typically in charge of tracking all the objects, spawned non-player characters, and otherwise acting as the server for the other consoles. Because multiplayer games are often based off of single-player games, and the single-player version of the game is programmed near the envelope of the consoles capabilities, a console acting as a server for multiple players can be severely strained.

To alleviate this strain, some open world games 'tether' the players together so that they cannot move too far from each other. This limits the interactive area to one that is managed by the peer-to-peer connected console which acts as the server. Unfortunately, tethering limits the independence of players who would otherwise split off into different missions and then reconnect later.

Thus, solutions for having players be able to split off from one another in a multiplayer video game using peer-to-peer connected game consoles are sought. Embodiments of the invention address these and other problems.

BRIEF SUMMARY

Embodiments in accordance with the present disclosure relate to multiplayer video games on peer-to-peer connected game consoles and other machines that, for a mission, track mission progress of each player as a series of objectives which generally must be completed in order. Each objective can include one or more conditions, such as to kill an enemy non-player character, which can be completed in any order. Once achieved, each condition typically cannot be undone during gameplay by the player or other players. After all the conditions for an objective are achieved, then the objective is met and the next objective in the series can be started. The mission progress of a player can be updated with that of another player, such that all the objectives and conditions that were met and achieved are then reflected in the mission progress of the first player.

An embodiment in accordance with the present disclosure relates to a multiplayer game system using a peer-to-peer network architecture. The system includes a first machine executing a video game with a predetermined sequence of game objectives, each objective including a predetermined set of conditions to be achieved by one or more players in order to progress to a subsequent objective, the first machine tracking a first mission progress line for a first player including which objectives have or have not been met and which conditions have or have not been achieved in the video game. The system also includes a second machine executing the video game and tracking a mission progress line for a second player, the second mission progress line tracking which objectives have or have not been met and which conditions have or have not been achieved in the video game, the machines operatively connected in a peer-to-peer network architecture. The machines are enabled to synchronize mission progress of the players by updating their respective mission progress lines with the mission progress line from the other machine.

Another embodiment in accordance with the present disclosure relates to a method of synchronizing a multiplayer video game on machines connected in a peer-to-peer network architecture. The method includes providing on a first machine a video game with a predetermined sequence of game objectives, each objective including a predetermined set of conditions to be achieved by one or more players in order for the video game to progress to a subsequent objective, tracking a first mission progress line for a first player, the tracking including storing in a memory which objectives of the sequence of game objectives have or have not been met and which conditions of each objective have or have not been achieved, receiving on the first machine data regarding a second mission progress line for a second player from a second machine connected in a peer-to-peer network to the first machine, and updating the first mission progress line with the received data regarding the second mission progress line, such that mission progress of the first player is at least that of the second player.

Another embodiment in accordance with the present disclosure relates to a method of synchronizing a multiplayer video game on machines connected in a peer-to-peer network architecture. The method includes tracking on a first machine a first instance of a mission progress line of a first player of a video game, the mission progress line including a sequence of objectives that must be followed in order by a player during gameplay, tracking on a second machine a second instance of the mission progress line of a second player of the video game, and updating on the first machine the first mission progress line with the second mission progress line, the updating occurring while the machines operate on a peer-to-peer network, such that mission progress of the first player in the video game is at least that of the second player.

Other embodiments relate to machine-readable tangible storage media and computer systems which employ or store instructions for the methods described above.

A further understanding of the nature and the advantages of the embodiments disclosed and suggested herein may be realized by reference to the remaining portions of the specification and the attached drawings.

The figures will now be used to illustrate different embodiments in accordance with the invention. The figures are specific examples of embodiments and should not be interpreted as limiting embodiments, but rather exemplary forms and procedures.

DETAILED DESCRIPTION

Generally, methods and systems are described for multiplayer video games on peer-to-peer connected game consoles, handheld electronic devices, cellular phones, personal computers, and other machines that track mission progress for each player in a mission as a series of objectives. Each objective generally must be completed in order to move on to the next objective during gameplay. Each objective can include a plurality of conditions which can be completed in any order during the pursuit of the objective. Once achieved, a condition cannot generally be undone during gameplay by the player(s) who achieved the condition or other players. After all the conditions for an objective are achieved, then the objective is considered 'met' and the next objective in the series can be started. The mission progress, diagrammed by a mission progress line, can be updated with the mission progress of other players. The met objectives and achieved conditions can be copied into one's own mission line, such that the player's mission progress is synchronized with the other player's progress.

Requiring a line of objectives to be met, instead of forked paths of objectives, allows a video game to smoothly and accurately re-synchronize the progress of multiple players. The players can achieve different conditions, such as killing particular enemies in a level. Then, the union of conditions achieved (and objectives met) by each player can be melded together so that mission progress of the game is advanced for all the players.

In a game with multiple missions (e.g. take over a fortress, capture an officer, kill three enemies), each player can concentrate on completing a different mission on his or her own. When the player's consoles are connected, the mission lines of the different players are synchronized together so that all the players benefit from the efforts of individual players.

Players can play the different missions offline at his or her leisure and then combine their progress later. For example, one player may stay up all night to finish a mission, while another player plays another mission during the day. The two players can synchronize their progress on the following weekend and continue playing together in real time.

An advanced player can help a novice player with different levels in the video game. The advanced player can pursue more difficult objectives and conditions, while the novice can concentrate on staying alive and achieving a condition here or there. Upon synchronization, the advanced player's efforts are bestowed upon the novice player, and whatever the novice player is able to achieve is given to the advanced player.

Figure 1:
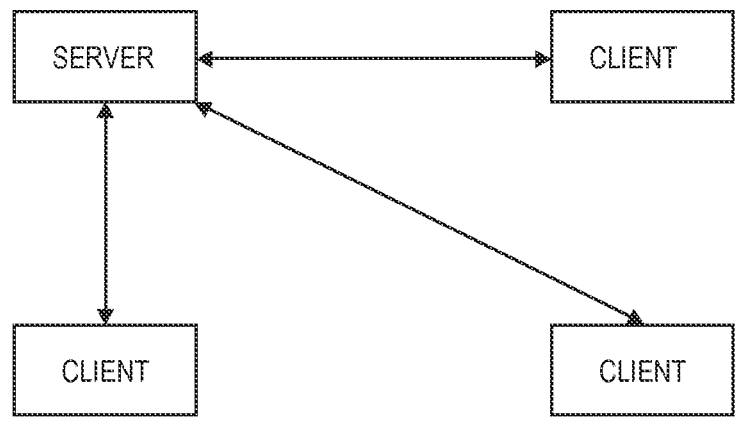
FIG. 1 illustrates a client-server network architecture.
Figure 2:
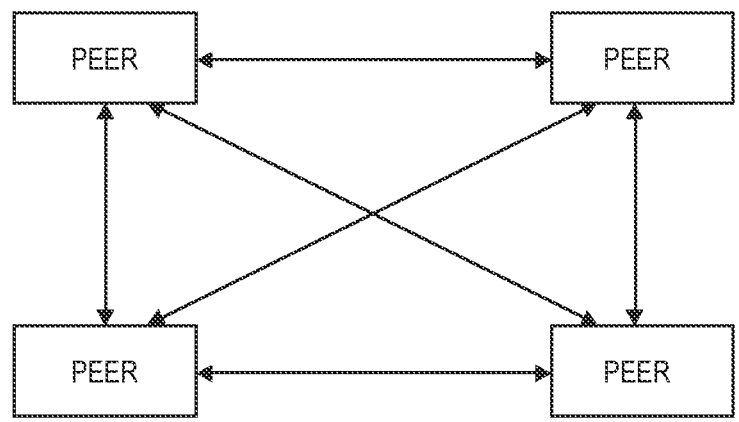
FIG. 2 illustrates a peer-to-peer network architecture.
Figure 3:
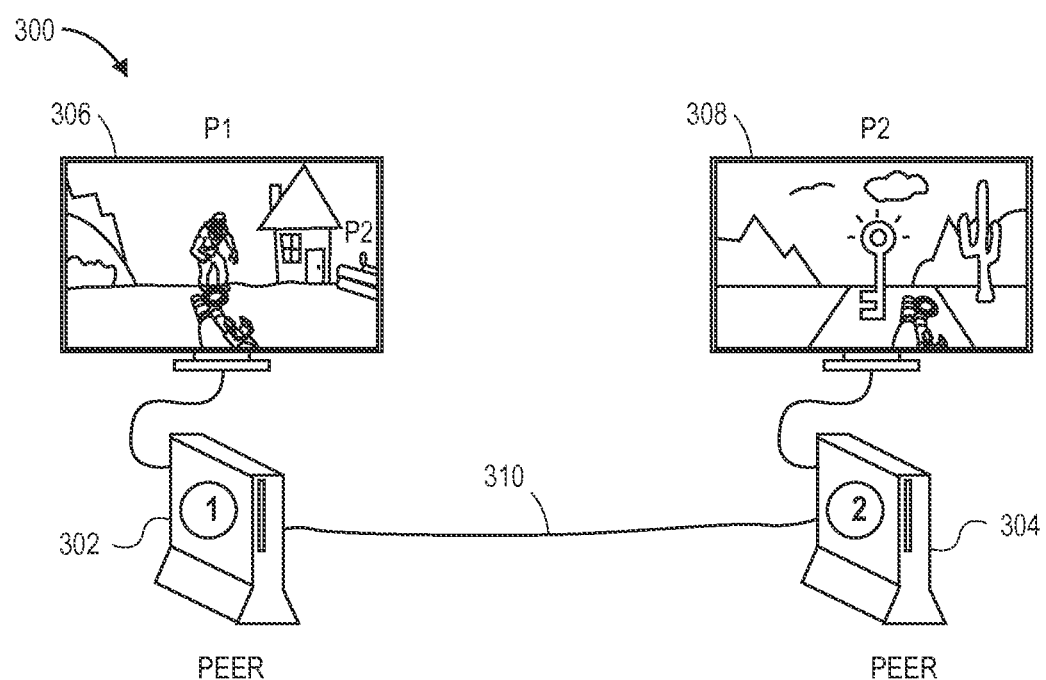
FIG. 3 illustrates peer-to-peer networked video game consoles in accordance with an embodiment.

FIG. 3 illustrates an example of peer-to-peer networked video game consoles and their respective displays. Peer-to-peer system 300 includes player P1 game console 302 with P1 display 306, player P2 game console 304 with P2 display 308, and wire connection 310 between the game consoles. As shown on the displays, players P1 and P2 are in separate areas of open world gameplay. As known in the art, the consoles could alternatively be connected via a wireless or networked connection, and/or can include displays as part of the consoles (e.g. in the same housing) in various embodiments.

Figure 4A:
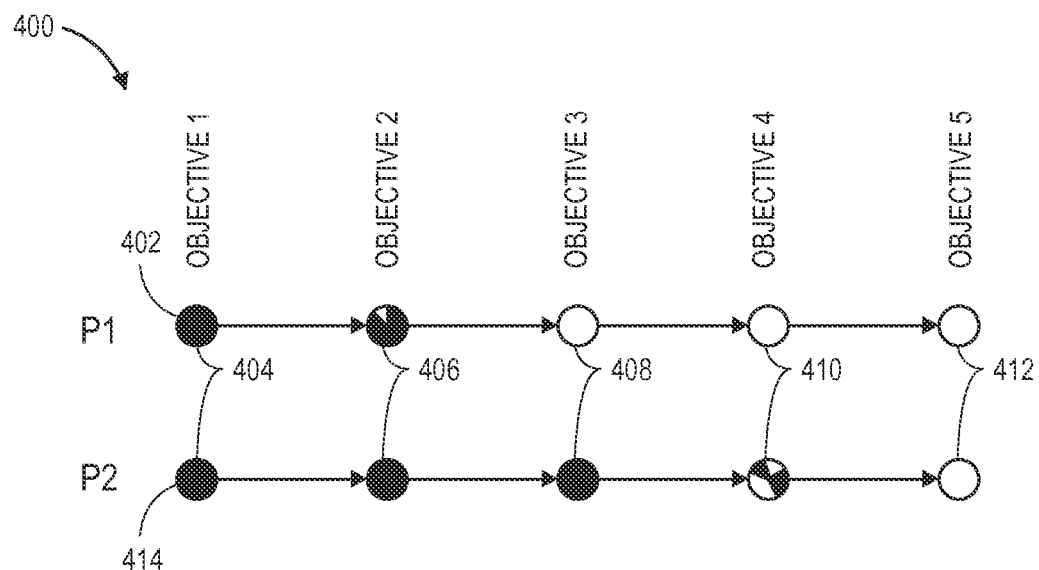
FIG. 4A illustrates mission progress lines for a first and second player in accordance with an embodiment.

FIG. 4A illustrates a mission progress line for player P1 and a mission progress line for player P2. The term 'mission progress line' can be shortened to 'mission line' or 'line' for brevity. Player P1 mission progress line 402 includes objectives 404, 406, 408, 410, and 412, referred to here as objectives 1-5, respectively. In this figure, a solid circle indicates a completely met objective. A partly filled circle indicates a partially met objective. An unfilled circle (i.e. without any fill in) indicates an objective without progress by the respective player. Player P2 mission progress line 414 includes the same objectives as player P1 mission progress line 402 but with different completion states. In the exemplary embodiment of the figures, player P1 has completed objective 1 and is currently working on objective 2. Meanwhile, player P2 has completed objectives 1-3 and is currently working on objective 4.

The mission progress accomplished by player P2, in meeting objectives 1-3 and starting on objective 4, can be passed to player P1. By doing so, an advanced player can help a novice player, or a player with more free time to play a video game can credit a player with less time.

Figure 4B:
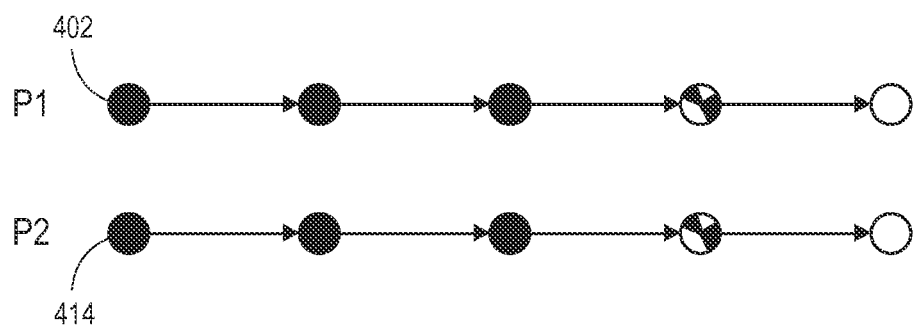
FIG. 4B illustrates a subsequent view of the mission progress lines in FIG. 4A.

FIG. 4B illustrates a subsequent view of the mission progress lines of FIG. 4A. Player P1 mission progress line 402 has been updated with received data regarding player P2 mission progress line 414. As shown in the figure, now player P1 mission progress line 402 shows objectives 1-3 completed and a good start to objective 4. This is the same as player P2 mission progress line 414. Although player P1 did not himself meet the objectives, the objectives were met, according to the video game. Player P1 can now play as if he had met the objectives himself.

Figure 5A:
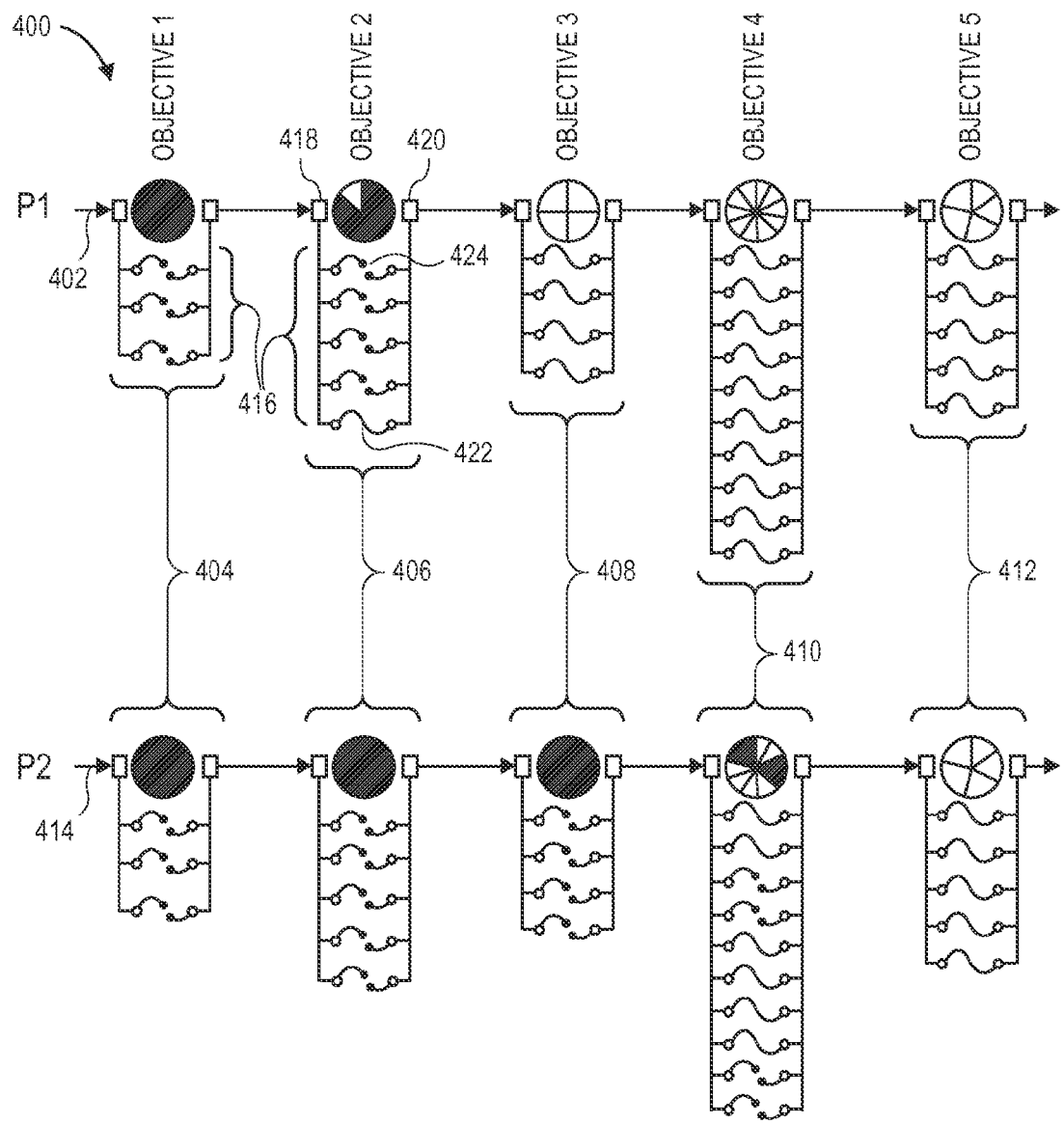
FIG. 5A illustrates a more detailed view of the mission progress lines in FIG. 4A.

FIG. 5A illustrates a more detailed view of the mission progress lines in FIG. 4A. Each mission progress line is composed of a series of objectives, such as objective 404 (i.e. objective 1), objective 406 (i.e. objective 2), and so on. At the beginning of each objective, the console can perform an action 418 such as spawn a new object, verify that a bridge is present, etc. At the end of each objective, the console can perform an action 420, such as play a cut save, verify that the bridge that was destroyed is really destroyed, give the player a big weapon, and other bookkeeping.

Each objective has a predetermined set of conditions 416 to be achieved by one or more players in order for the video game to progress to a subsequent objective. The set of conditions can include, for example, killing a number of enemy non-player characters. Objective 406 (i.e. objective 2) includes five conditions, each indicated in the figure by a fuse symbol. Each condition can include, for example, the killing of a particular enemy non-player character.

In the embodiment, the conditions of the set can be met or otherwise achieved in any order. When a condition is achieved (e.g. set to 'true'), the condition cannot be reset during gameplay. For example, when a particular enemy non-player character is killed, it cannot be resurrected by the player or another player. The enemy stays dead. In the exemplary embodiment, condition 422 of objective 2 has not been met or achieved, while condition 424 of objective 2 has been achieved.

For player P1 playing objective 2, all of the conditions of the previous objectives (i.e. objective 1) have been met. None of the conditions of the subsequent objectives (i.e. objectives 3-5) have been met. Only after all the conditions of objective 2 have been met can gameplay for player P1 move on to the subsequent objective, objective 3.

Meanwhile, player P2 is on objective 4. All of the conditions of the previous objectives (i.e. objectives 1-3) have been met. None of the conditions of the subsequent objectives (i.e. objective 5) have been met.

Upon tying into the peer-to-peer network, player P2's console sends information or other data to player P1's console regarding player P2 mission progress line 414. Player P1's console updates player P1 mission progress line 402 with the received data regarding player P2 mission progress line 414.

Figure 5B:
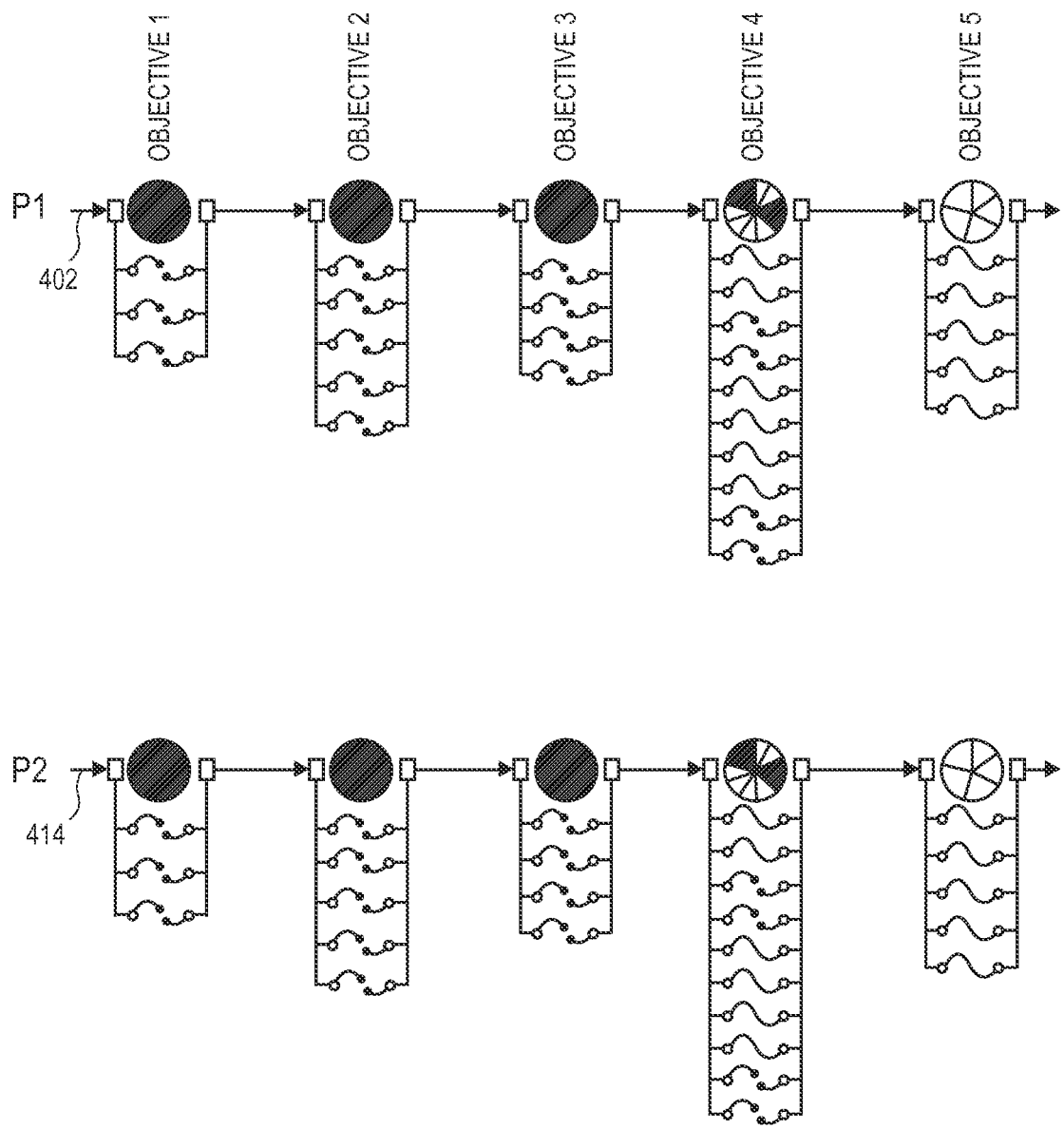
FIG. 5B illustrates a more detailed view of the mission progress lines in FIG. 4B.

FIG. 5B shows the result of the updating. Player P1 mission line 402 is now identical to player P2 mission line 414, with the same objectives met and conditions achieved.

Figure 6A:
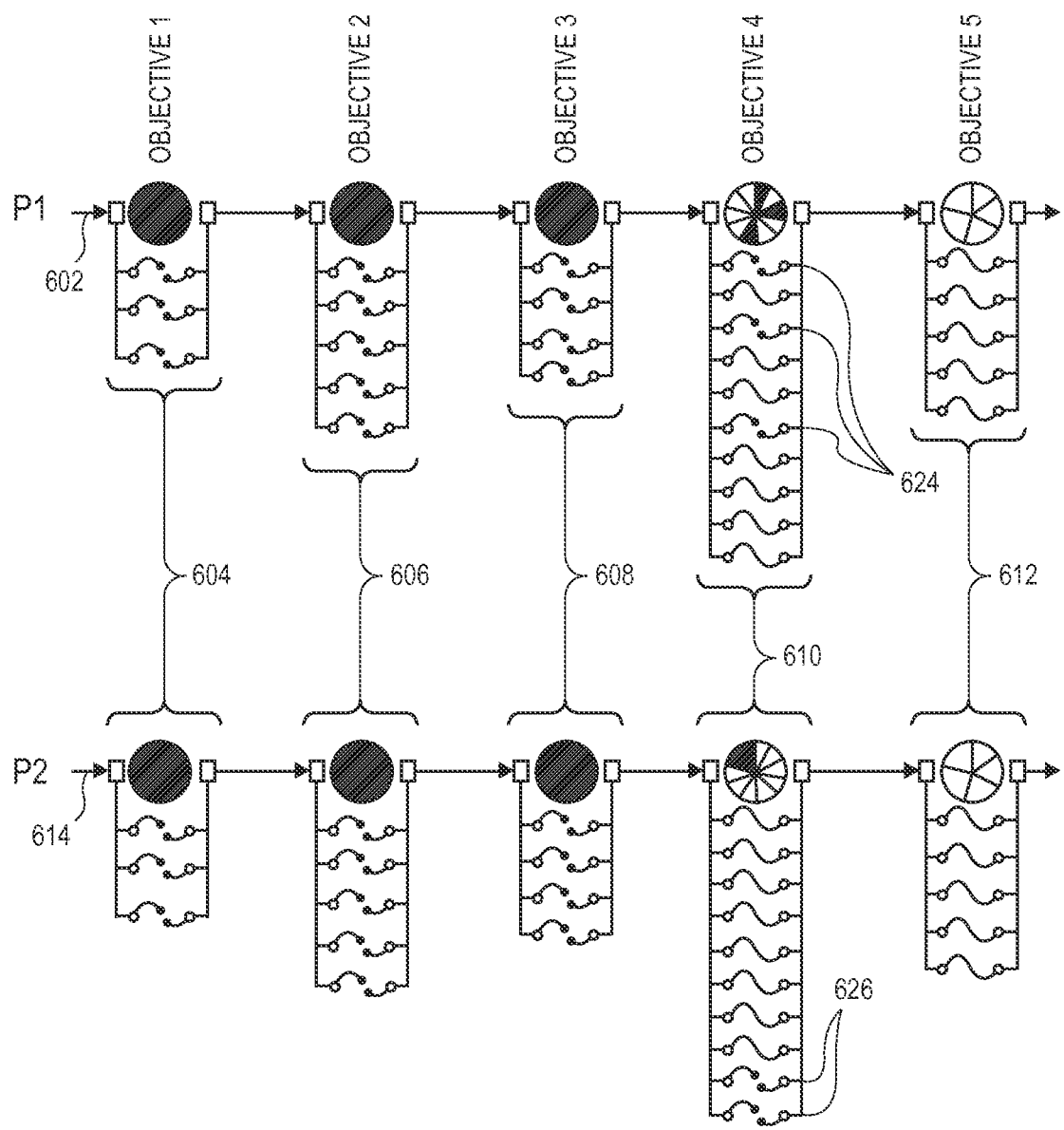
FIG. 6A illustrates mission progress lines and conditions for a first and second player pursuing the same objective in accordance with an embodiment.

FIG. 6A illustrates mission progress lines and conditions for a first and second player pursuing the same objective in the video game. Player P1 mission progress line 602 shows player P1 has met objectives 1-3 and is working on objective 4. Player P2 mission progress line 614 shows the same for player P2. However, player 1 has completed conditions 624, and player 2 has completed different conditions 626.

To update player P1, player P2's game console sends, and player P1's game console receives, data regarding player P2 mission progress line 614. Using the received data, player P1's game console updates player P1 mission progress line 602 such that it reflects the union of the conditions achieved between the two players.

Figure 6B:
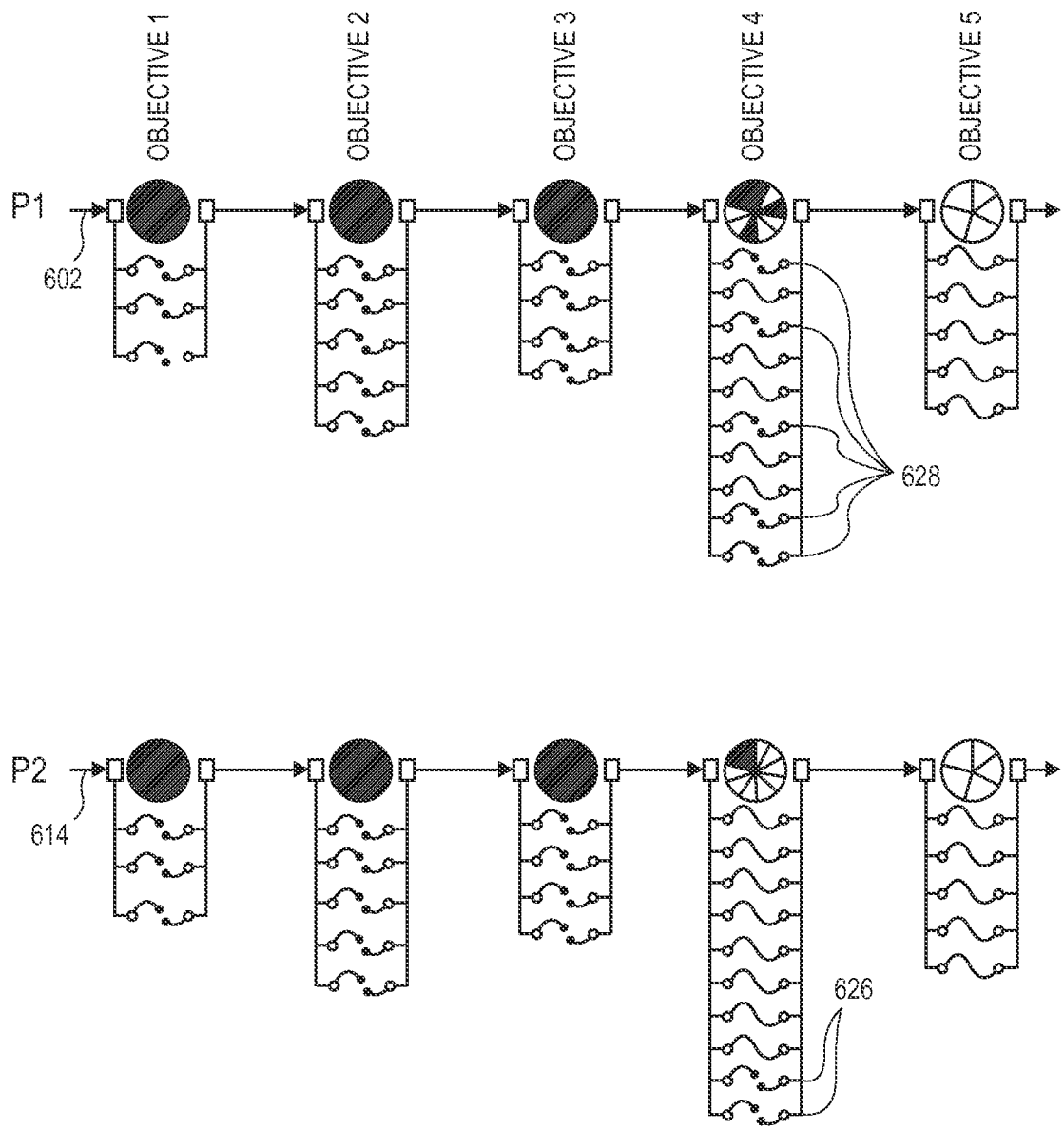
FIG. 6B illustrates a subsequent view of the mission progress lines in FIG. 6A.

FIG. 6B illustrates the result of the update to player P1 mission progress line 602. Union of achieved conditions 628 includes conditions 624 and 626 and is applied to player P1 mission progress line 602. All the other conditions of the other objectives (i.e. objectives 1-3 and 5) remain the same.

To update player P2, player P1's game console sends, and player P2's game console receives, data regarding player P1 mission progress line 602. Using the data sent from player P1's console, player P2's game console updates player P2 mission progress line 614 such that it reflects the union of the conditions achieved between the two players.

Figure 6C:
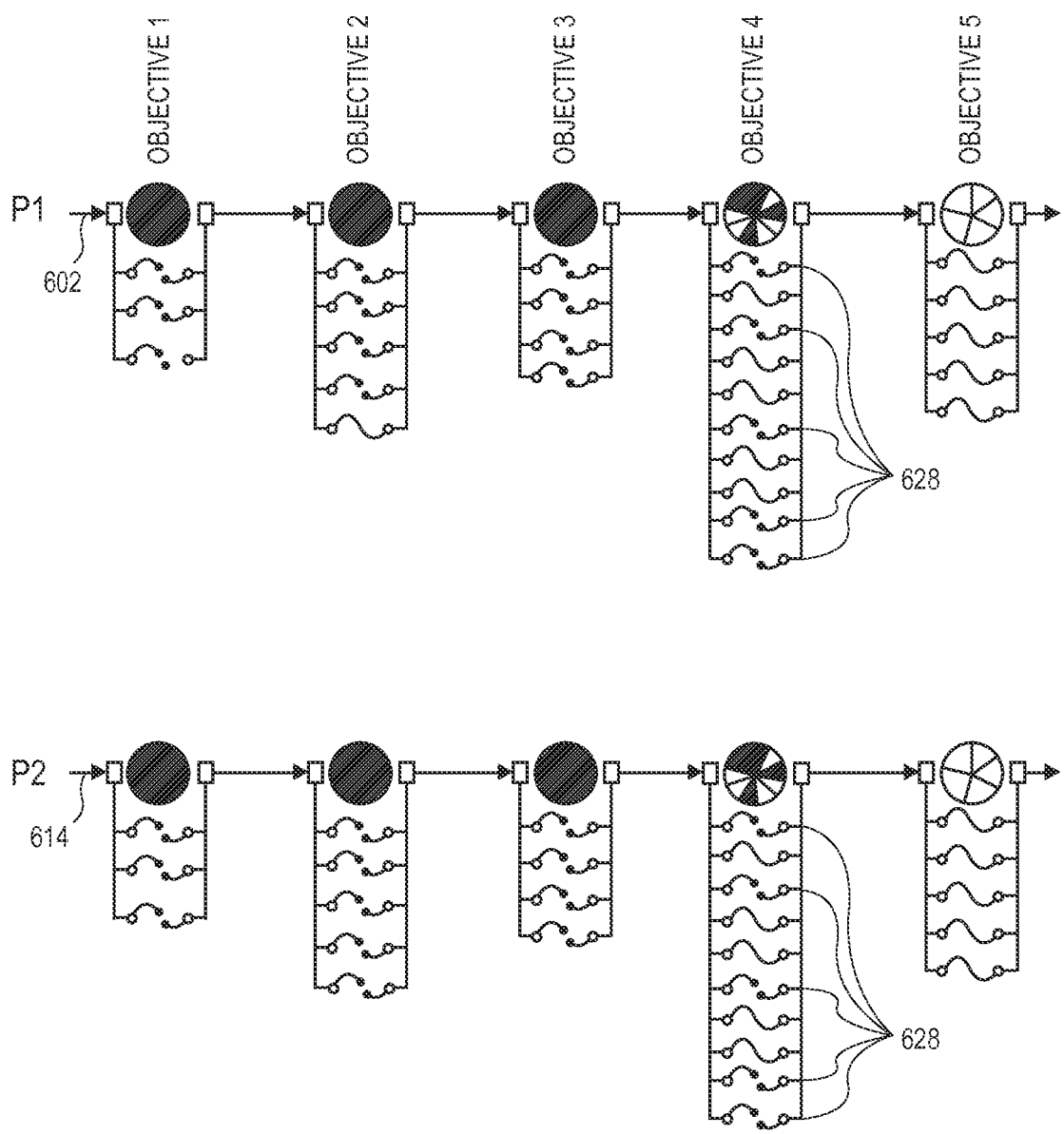
FIG. 6C illustrates a subsequent view of the mission progress lines in FIG. 6B.

FIG. 6C illustrates the result of the update to player P2 mission progress line 614. Union of achieved conditions 628 is applied to player P2 mission progress line 614. All the other conditions of the other objectives (i.e. objectives 1-3 and 5) remain the same.

Figure 7A:
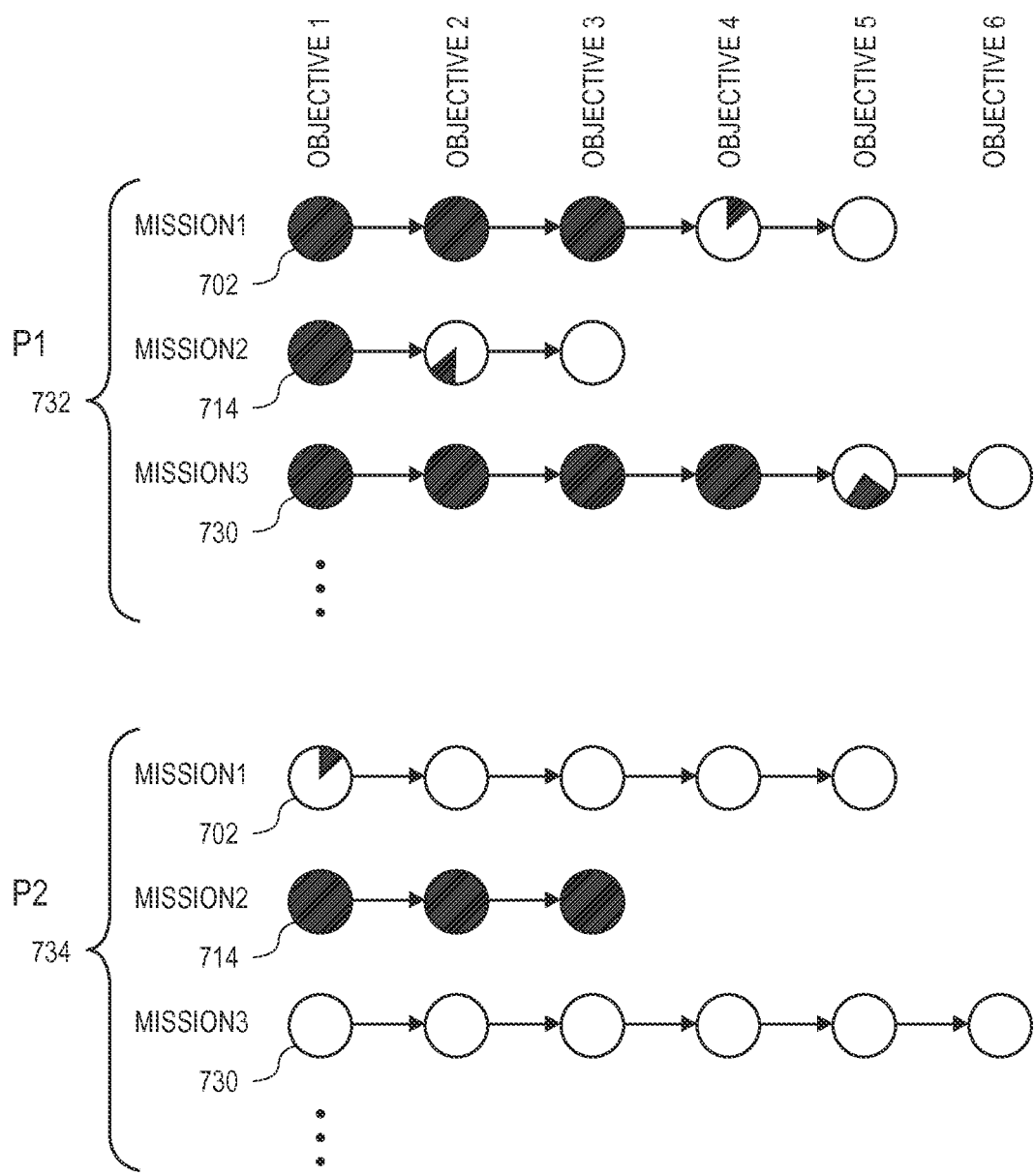
FIG. 7A illustrates mission progress lines for players on multiple missions in accordance with an embodiment.

FIG. 7A illustrates mission progress lines for players on multiple missions. Player P1 has started missions 1, 2, and 3, which are tracked by player P1 mission progress lines 702, 714, and 730, respectively. The starting of missions is indicated in the figures by partial fill-ins of the respective circles. Player P1 is on objective 4 of mission 1, objective 2 of mission 2, and objective 5 of mission 3. Meanwhile, player P2 has started mission 1 (and is on objective 1 of mission 1) and has finished mission 2.

Player P2's set of mission progress lines 734 can be used to update player P1's set of mission progress lines 732. All of the objectives and conditions are loaded from P2's console to P1's console.

Figure 7B:
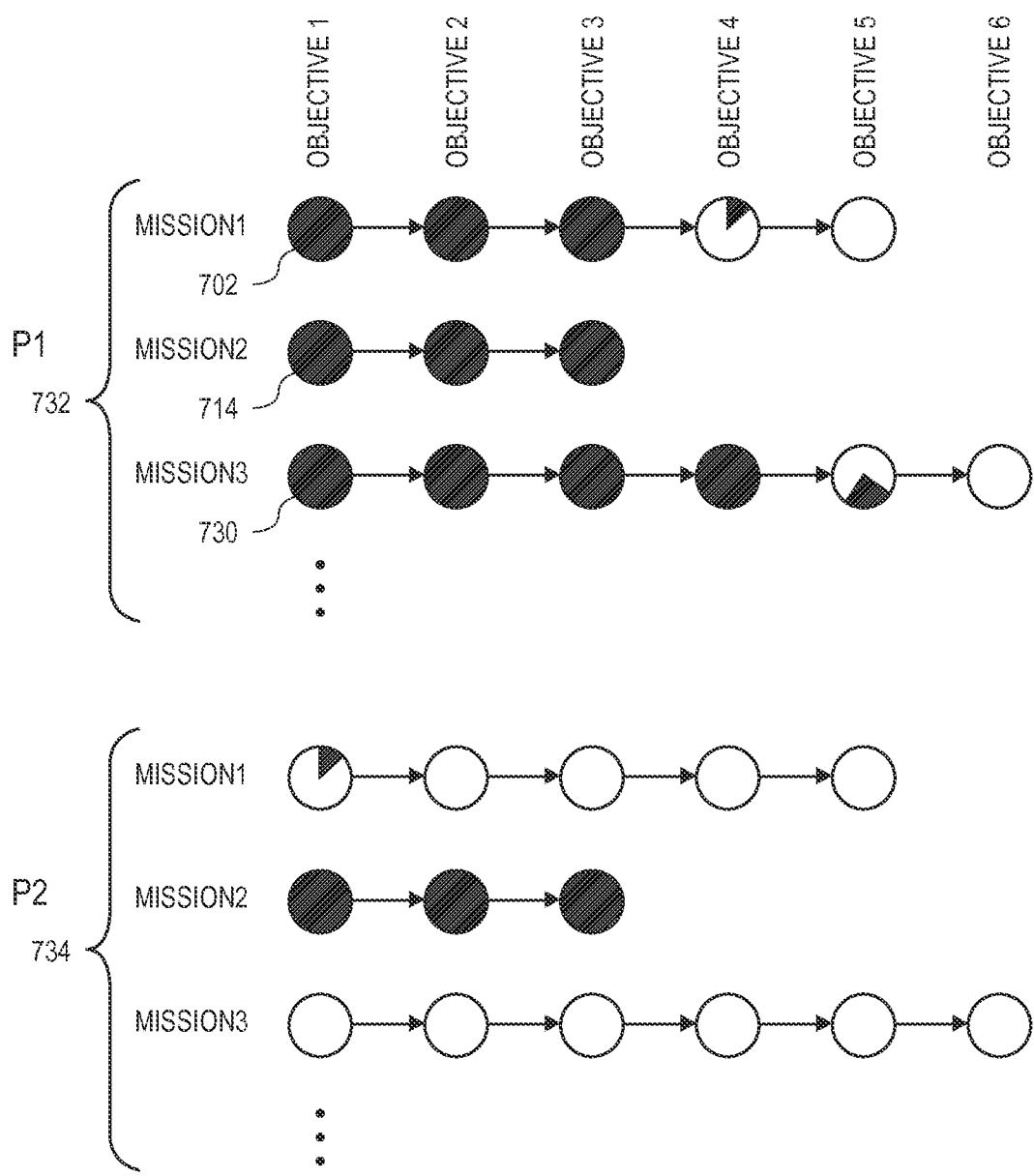
FIG. 7B illustrates a subsequent view of the mission progress lines in FIG. 7A.

FIG. 7B illustrates the updated mission progress lines of player P1. Player P1 mission progress line 702 (i.e. mission line 1) was ahead of player P2's mission progress line; therefore, no updates are needed. The same is true for player P1 mission progress line 730 (i.e. mission line 3). However, player P2 had finished all the objectives, including the conditions, of mission 2, which is more than what player P1 had accomplished. This is updated into player P1 mission progress line 714 (i.e. mission line 2).

Player P1's set of mission progress lines 732 can be used to update player P2's set of mission progress lines 734. All of the objectives and conditions are loaded from P1's console to P2's console.

Figure 7C:
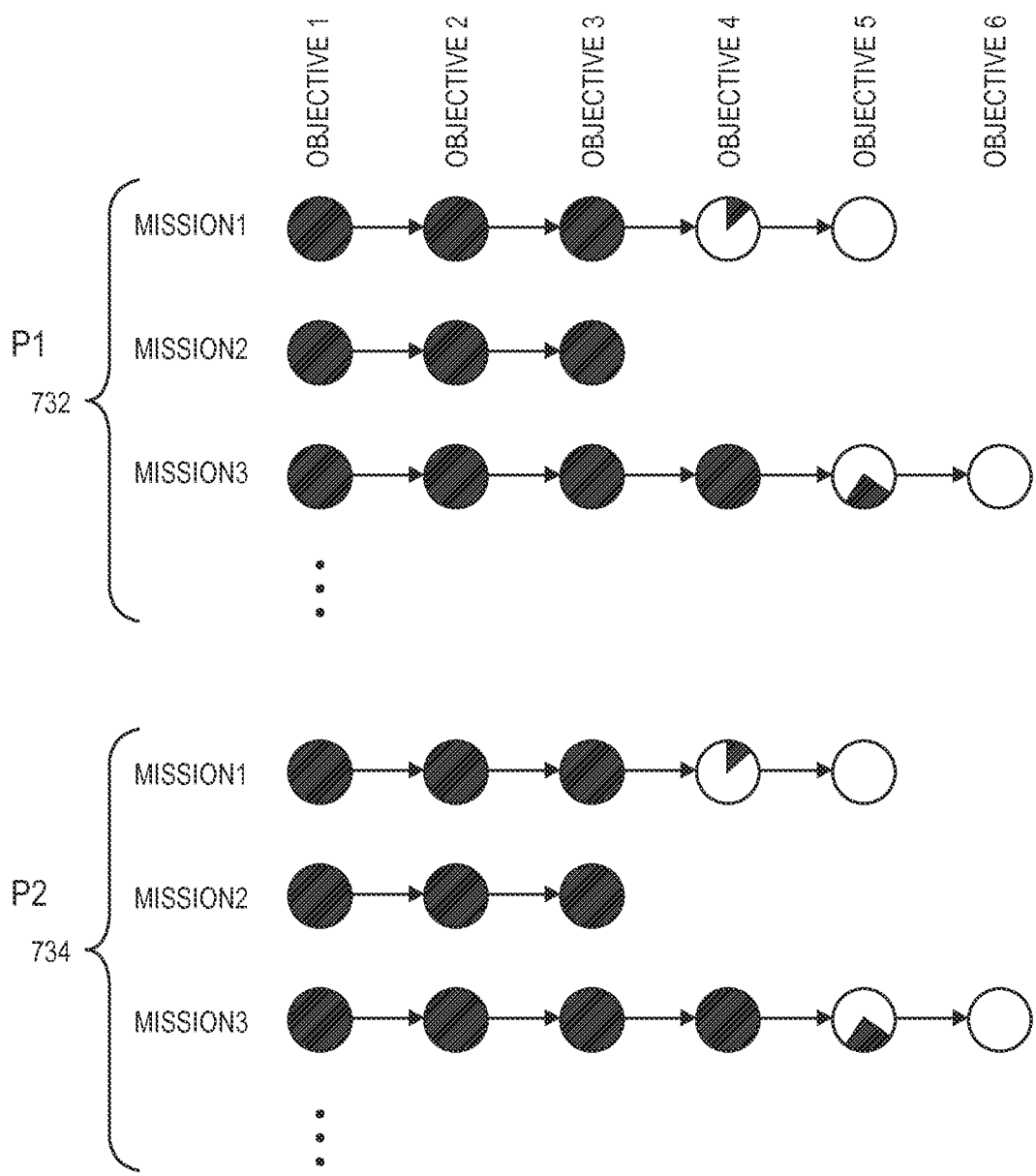
FIG. 7C illustrates a subsequent view of the mission progress lines in FIG. 7B.

FIG. 7C illustrates the updated mission progress lines of player P2. After the update of player P2's mission lines, players P1 and P2 have cross-updated their objectives and conditions and thus synchronized their mission profiles.

Figure 8:
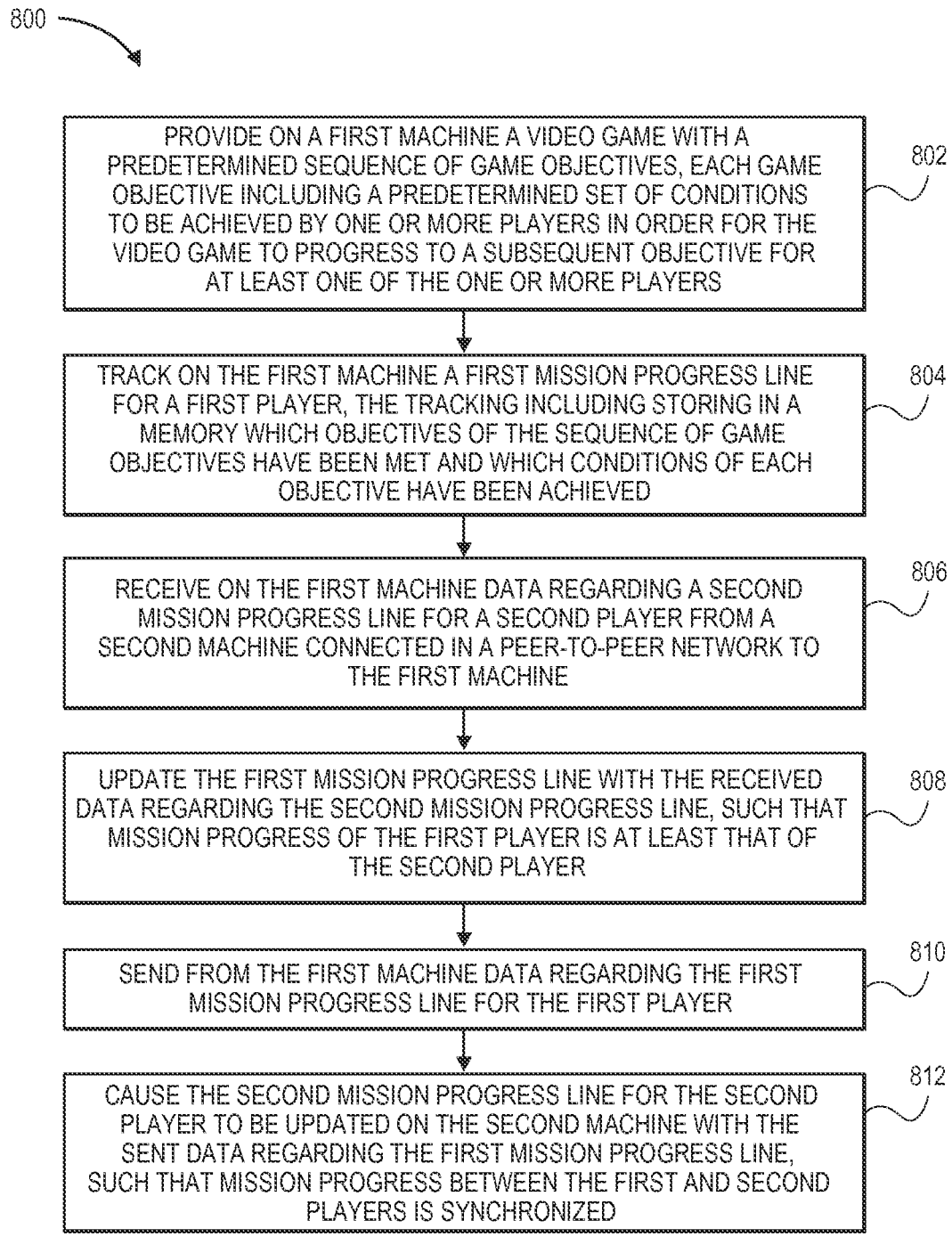
FIG. 8 is a flowchart illustrating a process in accordance with an embodiment.

FIG. 8 shows an example flowchart illustrating process 800 in accordance with one embodiment. This process can be automated in a computer or other machine. The process can be coded in software, firmware, or hard coded as machine-readable instructions and run through one or more processors that can implement the instructions. In operation 802, a video game with a predetermined sequence of game objectives is provided on a first machine. Each game objective includes a predetermined set of conditions to be achieved by one or more players in order for the video game to progress to a subsequent objective for at least one of the one or more players. In operation 804, a first mission progress line is tracked on the first machine for a first player. The tracking includes storing in a memory which objectives of the sequence of game objectives have or have not been met, and which conditions of each objective have or have not been achieved. In operation 806, data regarding a second mission progress line for a second player is received from a second machine connected in a peer-to-peer network by the first machine. In operation 808, the first mission progress line is updated with the received data regarding the second mission progress line, such that mission progress of the first player is at least that of the second player. In operation 810, data regarding the first mission progress line for the first player is sent from the first machine. In operation 812, the second mission progress line for the second player is caused to be updated on the second machine with the sent data regarding the first mission progress line, such that mission progress between the first and second players is synchronized. These operations may be performed in the sequence given above or in different orders as applicable.

Figure 9:
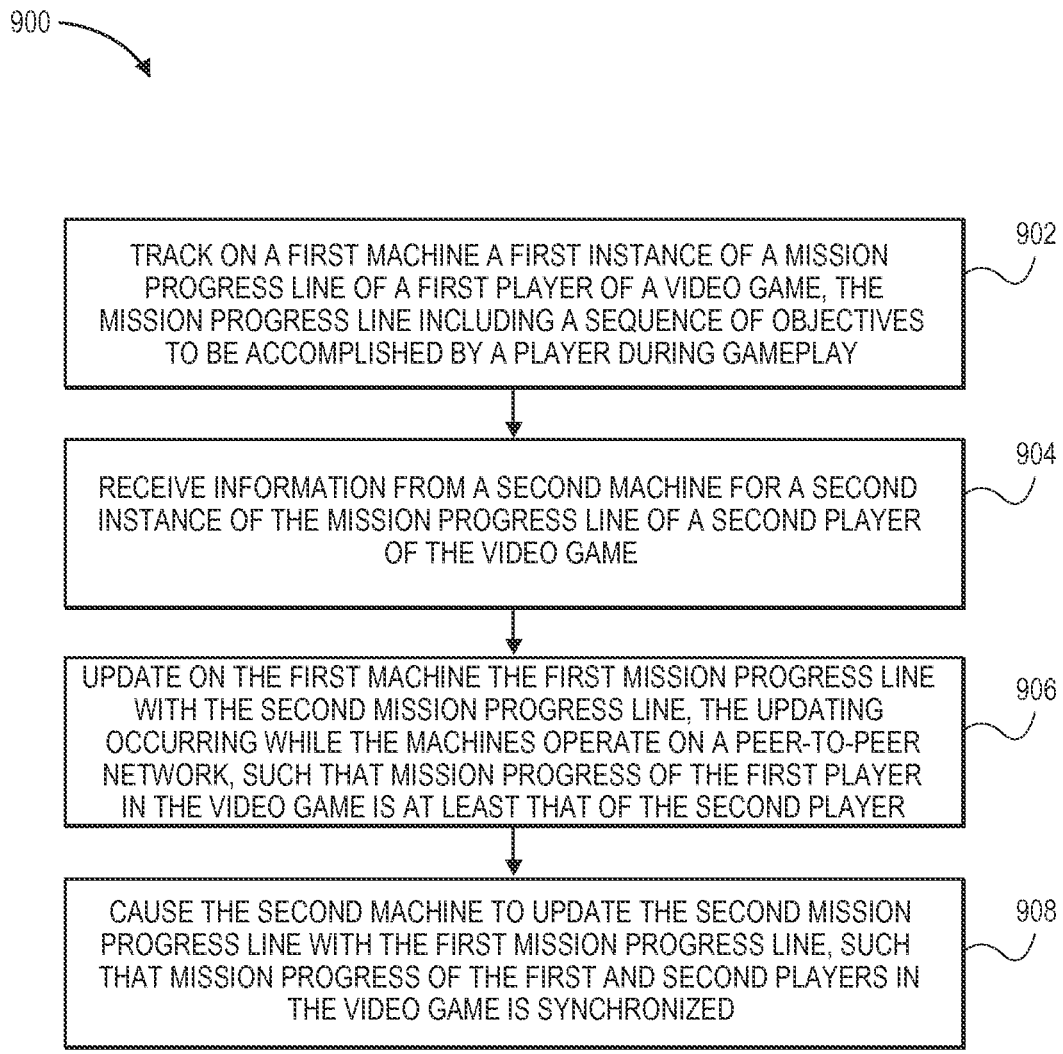
FIG. 9 is a flowchart illustrating a process in accordance with an embodiment.

FIG. 9 shows an example flowchart illustrating process 900 in accordance with one embodiment. As with the process in the previous figure, this process can be automated in a computer or other machine and can be coded in software, firmware, or hard coded as machine-readable instructions and run through one or more processors that can implement the instructions. In operation 902, a first instance of a mission progress line of a first player of a video game is tracked on a first machine. The mission progress line includes a sequence of objectives to be accomplished or that must be followed in order by a player during gameplay. In operation 904, information from a second machine is received for a second instance of the mission progress line of a second player of the video game. In operation 906, the first mission progress line is updated on the first machine with the second mission progress line. The updating occurs while the machines operate on a peer-to-peer network. Mission progress of the first player in the video game is at least that of the second player. In operation 908, the second mission progress line is caused to be updated on the second machine with the first mission progress line, such that mission progress of the first and second players in the video game is synchronized. These operations may be performed in the sequence given above or in different orders as applicable.

Figure 10:
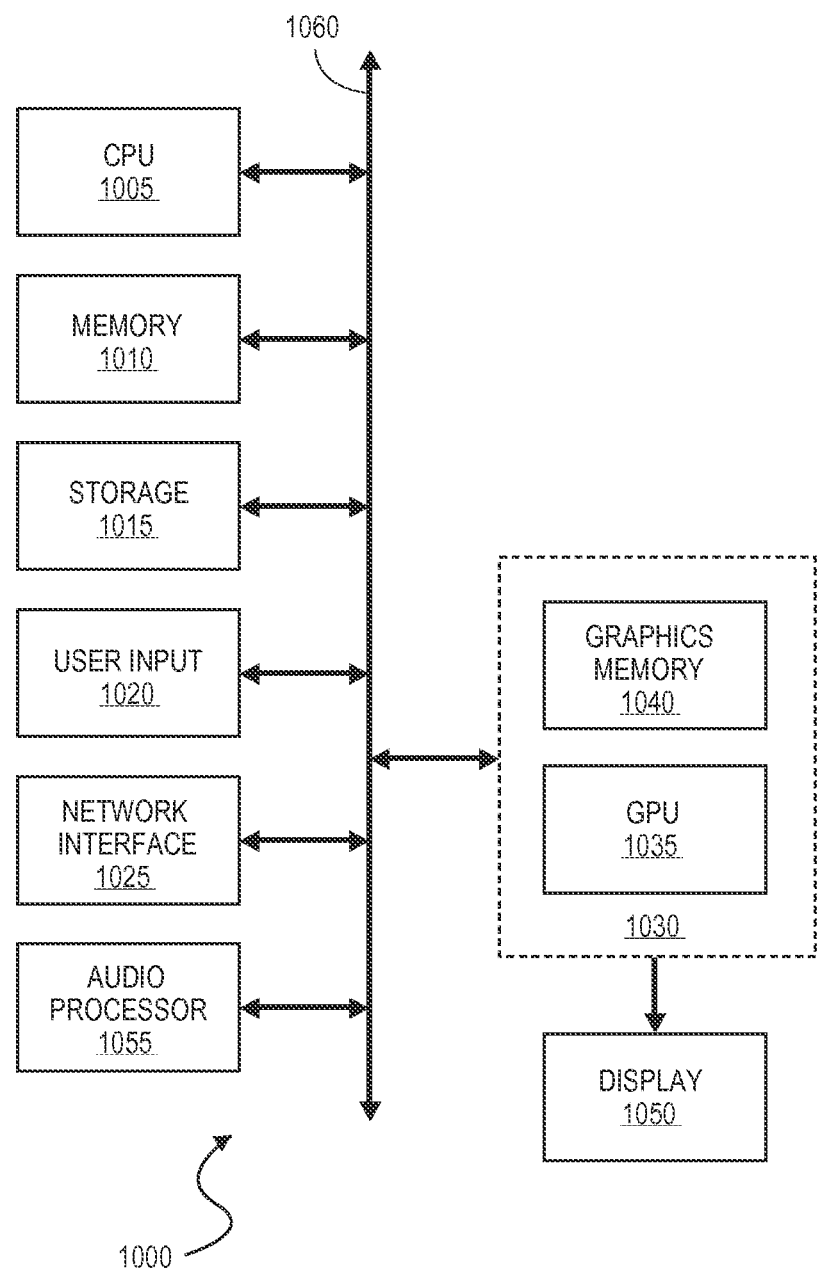
FIG. 10 illustrates an example computer system suitable for use with embodiments of the invention.

FIG. 10 illustrates an example computer system suitable for use with embodiments of the invention. The figure is a block diagram of a computer system 1000, such as a personal computer, video game console, personal digital assistant, or other digital device, suitable for practicing an embodiment of the invention. Computer system 1000 includes a central processing unit (CPU) 1005 for running software applications and optionally an operating system. CPU 1005 may be comprised of one or more homogeneous or heterogeneous processing cores. Memory 1010 stores applications and data for use by the CPU 1005. Storage 1015 provides non-volatile storage for applications and data and may include fixed disk drives, removable disk drives, flash memory devices, and CD-ROM, DVD-ROM, Blu-ray, HD-DVD, or other optical storage devices. User input devices 1020 communicate user inputs from one or more users to the computer system 1000, examples of which may include keyboards, mice, joysticks, touch pads, touch screens, still or video cameras, and/or microphones. Network interface 1025 allows computer system 1000 to communicate with other computer systems via an electronic communications network, and may include wired or wireless communication over local area networks and wide area networks such as the Internet. An audio processor 1055 is adapted to generate analog or digital audio output from instructions and/or data provided by the CPU 1005, memory 1010, and/or storage 1015. The components of computer system 1000, including CPU 1005, memory 1010, data storage 1015, user input devices 1020, network interface 1025, and audio processor 1055 are connected via one or more data buses 1060.

A graphics subsystem 1030 is further connected with data bus 1060 and the components of the computer system 1000. The graphics subsystem 1030 includes a graphics processing unit (GPU) 1035 and graphics memory 1040. Graphics memory 1040 includes a display memory (e.g., a frame buffer) used for storing pixel data for each pixel of an output image. Graphics memory 1040 can be integrated in the same device as GPU 1035, connected as a separate device with GPU 1035, and/or implemented within memory 1010. Pixel data can be provided to graphics memory 1040 directly from the CPU 1005. Alternatively, CPU 1005 provides the GPU 1035 with data and/or instructions defining the desired output images, from which the GPU 1035 generates the pixel data of one or more output images. The data and/or instructions defining the desired output images can be stored in memory 1010 and/or graphics memory 1040. In an embodiment, the GPU 1035 includes 3D rendering capabilities for generating pixel data for output images from instructions and data defining the geometry, lighting, shading, texturing, motion, and/or camera parameters for a scene. The GPU 1035 can further include one or more programmable execution units capable of executing shader programs.

The graphics subsystem 1030 periodically outputs pixel data for an image from graphics memory 1040 to be displayed on display device 1050. Display device 1050 is any device capable of displaying visual information in response to a signal from the computer system 1000, including CRT, LCD, plasma, and OLED displays. Computer system 1000 can provide the display device 1050 with an analog or digital signal.

In embodiments of the invention, CPU 1005 is one or more general-purpose microprocessors having one or more processing cores. Further embodiments of the invention can be implemented using one or more CPUs with microprocessor architectures specifically adapted for highly parallel and computationally intensive applications, such as media and interactive entertainment applications.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A multiplayer game system comprising:
a first machine executing a video game with a predetermined sequence of game objectives, each objective to be met by one or more players in order to progress to a subsequent objective, the first machine tracking a first mission progress line for a first player including which objectives have been met in the video game, at least a portion of met objectives of the first mission progress line occurring during a first time period; and
an interface for a peer-to-peer network, the first machine enabled to receive information through the peer-to-peer interface from a second machine executing the video game and tracking a second mission progress line for a second player, the second mission progress line tracking which objectives have been met in the video game, at least a portion of met objectives of the second mission progress line occurring during a second time period outside of the first time period and during which the first and second machines are not in communication with one another,
wherein the first machine is enabled to synchronize mission progress of the first and second players by updating the first mission progress line with a union of a set of objectives that have been achieved by the first player and a set of objectives that have been achieved by the second player.

2. The system of claim 1 wherein the first machine is further enabled to give at least one of the first and second players a weapon as a result of the updating of the first and second mission progress lines.

3. The system of claim 1 wherein the first machine is further enabled to play a cut scene as a result of the updating of the first and second mission progress lines.

4. The system of claim 1 further comprising:
the second machine,
wherein the second machine is enabled to synchronize mission progress of the first and second players by updating the second mission progress line with the union of the set of objectives that have been achieved by the first player and the set of objectives that have been achieved by the second player.

5. The system of claim 1 wherein an objective of the sequence of objectives includes one or more conditions, all of which must be achieved before progressing to a subsequent objective.

6. A method of synchronizing a multiplayer video game on multiple machines, the method comprising:
providing on a first machine a video game with a predetermined sequence of game objectives, each game objective to be met by one or more players in order for the video game to progress to a subsequent objective for at least one of the one or more players;
tracking on the first machine a first mission progress line for a first player, the tracking including storing in a memory which objectives have been met;
receiving on the first machine data regarding a second mission progress line for a second player from a second machine operatively connected with the first machine, the second machine having tracked at least a portion of the second mission progress line while the first machine was unavailable to communicate regarding the game; and
updating the first mission progress line with the received data regarding the second mission progress line, such that an updated first mission progress line of the first player is at least the union of a set of objectives that have been achieved by the first player and a set of objectives that have been achieved by the second player.

7. The method of claim 6 wherein the receiving and updating are performed as a result of connecting at least one of the first and second machines to a peer-to-peer network.

8. The method of claim 6 further comprising:
giving at least one of the first and second players a weapon as a result of the updating of the first mission progress line.

9. The method of claim 6 further comprising:
playing to at least one of the first and second players a cut scene as a result of the updating of the first mission progress lines.

10. The method of claim 6 further comprising:
sending from the first machine data regarding the first mission progress line for the first player; and
causing the second mission progress line for the second player to be updated on the second machine with the sent data regarding the first mission progress line, such that an updated second mission progress line of the second player is at least the union of the first and second mission progress lines.

11. The method of claim 6 wherein the updating includes updating the second mission progress line with the union of the set of objectives that have been achieved by the first player and the set of objectives that have been achieved by the second player.

12. The method of claim 6 wherein one of the objectives is killing a number of characters.

13. The method of claim 6 wherein an objective of the sequence of objectives includes one or more conditions, all of which must be achieved before progressing to a subsequent objective.

14. The method of claim 6 further comprising:
performing an action at a start of an objective; and
performing an action at an end of the objective.

15. The method of claim 6 wherein the providing, tracking, and updating are performed while the first and second machines are on a peer-to-peer network.

16. The method of claim 6 wherein being unavailable to communicate about the game comprises being powered down.

17. The method of claim 6 wherein being unavailable to communicate about the game comprises executing a different game.

18. The method of claim 6 wherein being unavailable to communicate about the game comprises executing a program other than the video game.

19. The method of claim 6 wherein the providing, tracking, receiving, and updating are performed in the order recited.

20. A machine-readable tangible storable medium embodying information indicative of instructions for causing one or more machines to perform operations, the operations comprising:

providing on a first machine a video game with a predetermined sequence of game objectives, each game objective to be met by one or more players in order for the video game to progress to a subsequent objective for at least one of the one or more players;

tracking on the first machine a first mission progress line for a first player, the tracking including storing in a memory which objectives have been met;

receiving on the first machine data regarding a second mission progress line for a second player from a second machine operatively connected with the first machine, the second machine having tracked at least a portion of the second mission progress line while the first machine was unavailable to communicate regarding the game; and updating the first mission progress line with the received data regarding the second mission progress line, such that an updated first mission progress line of the first player is at least the union of a set of objectives that have been achieved by the first player and a set of objectives that have been achieved by the second player.

* * * * *